(12) United States Patent
Kim et al.

(10) Patent No.: US 11,613,279 B1
(45) Date of Patent: *Mar. 28, 2023

(54) TRAIN RAIL POWER GENERATING SYSTEM AND METHOD

(71) Applicant: K-TECHNOLOGY USA, INC., Los Angeles, CA (US)

(72) Inventors: Ki Il Kim, Los Angeles, CA (US); Young Kim, Los Angeles, CA (US); Paul Kim, Beverly Hills, CA (US); Sarah Duncanson, Los Angeles, CA (US)

(73) Assignee: K-TECHNOLOGY USA, INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/942,060

(22) Filed: Sep. 9, 2022

Related U.S. Application Data (63) Continuation-in-part of application No. 17/893,748, filed on Aug. 23, 2022.

(51) Int. Cl.
| | |
|---|---|
| *B61C 7/04* | (2006.01) |
| *B61C 3/00* | (2006.01) |
| *B60L 8/00* | (2006.01) |
| *B61F 5/52* | (2006.01) |
| *H02K 7/18* | (2006.01) |

(Continued)

(52) U.S. Cl.
CPC ............... *B61C 7/04* (2013.01); *B60L 8/006* (2013.01); *B61C 3/00* (2013.01); *B61F 5/52* (2013.01); *F03D 9/25* (2016.05); *H02K 7/183* (2013.01); *H02K 7/1846* (2013.01);

(Continued)

(58) Field of Classification Search
CPC .......... B60L 50/00; B60L 50/10; B60L 50/51; B60L 50/52; B60L 2200/26; B60L 8/006; B61D 43/00; B61C 3/00; B61C 7/04; F03D 9/25; B61F 5/52; H02K 7/183; H02K 7/1846; H02K 11/0094; H02K 11/04
See application file for complete search history.

(56) References Cited

U.S. PATENT DOCUMENTS

| | | |
|---|---|---|
| 5,828,135 A | 10/1998 | Barrett |
| 2018/0297614 A1 | 10/2018 | Seybold et al. |
| 2020/0398675 A1* | 12/2020 | Then-Gautier ....... F16D 55/226 |

FOREIGN PATENT DOCUMENTS

WO     2016/027047 A1     2/2016

* cited by examiner

*Primary Examiner* — Robert J McCarry, Jr.
(74) *Attorney, Agent, or Firm* — Novick, Kim & Lee, PLLC; Jae Youn Kim (57) ABSTRACT

Proposed are renewable power generating systems driven by wind or wheel power such as train vehicle power generating systems, which are easily installed on train vehicles of trains, and which generate power without additional carbon emissions to avoid environmental pollution. One or more generator holders to hold one or more generators are installable on a train vehicle chassis. A generator wheel may be configured to touch a rail and may rotate in any direction along the rail. A generator axle may couple one or more generators to the generator wheel. The one or more generators may generate electrical power and produce zero carbon emissions while the generator wheel rotate on the rail. One or more wind turbines may also be coupled to the generator axle to supply power to the one or more generators so that the one or more generators produce zero carbon emissions while the train vehicle is moving.

20 Claims, 8 Drawing Sheets

(51) Int. Cl.
*H02K 11/00* (2016.01)
*H02K 11/04* (2016.01)
*F03D 9/25* (2016.01)

(52) U.S. Cl.
CPC ......... *H02K 11/0094* (2013.01); *H02K 11/04* (2013.01); *B60L 2200/26* (2013.01)

FIG. 8

TRAIN RAIL POWER GENERATING SYSTEM AND METHOD

1. FIELD OF THE INVENTION

One or more embodiments of the present invention relate to vehicle power generating systems and include train vehicle power generating systems, which are easily installed on vehicles such as train vehicles of trains, and which generate power without additional carbon emissions to avoid environmental pollution.

2. DESCRIPTION OF THE RELATED ART

Vehicles including trains move a large number of people and products from one destination to another. Trains include train vehicles with each train vehicle requiring electrical power. However, attempts to design electrical generators powered by the rotating components currently on train vehicles of trains have not been successful due to the cumbersome, complex arrangements of components. For example, conventional gasoline powered generators have not been found to be effective for train vehicles because of the expense, lack of long-term reliability, difficult maintenance, difficulty in turning the gasoline powered generators on and off as needed, operating the gasoline powered generators for very long periods, and polluting the environment with carbon emissions. In addition, the current designs of power generating systems require a very expensive installation, which can only be performed at a factory.

For example, there is a continuing need for an electrical power system located at each train vehicle in a train that is reliable, inexpensive, environmentally friendly, easy to install on existing or new train vehicles at any location, and capable of operating components on a train vehicle such as brakes, running lights, sensors to sense conditions on the train vehicle including temperature sensors, and transmission systems for transmitted the sensed information. In another example, electrical vehicles such cars, buses, trucks, trailers, and the like also have a continuing need for an electrical power system in each electrical vehicle.

Accordingly, there is a need for a new system for generating power easily installed on each vehicle including each train vehicle without additional carbon emissions to reduce greenhouse gases such as carbon emissions so that people and freight are transported by vehicles including trains in a manner that is friendly to the environment.

SUMMARY OF THE INVENTION

In consideration of the above problems, one aspect of the present invention is to propose adding one or more wheels coupled to one or more generators to a train vehicle chassis (train vehicle body) of a train vehicle to generate electrical power to operate one or more components of the train vehicle without generation of carbon emissions to avoid environmental pollution.

As an embodiment of the present invention, a train vehicle power generating system for generating electrical power for a train vehicle is proposed. The train vehicle power generating system may include: at least one generator to generate electrical power; a generator holder to hold the at least one generator and installable on a train vehicle chassis; a generator wheel configured to touch a rail and capable of rotating in any direction along the rail; and a generator axle to couple the at least one generator to the generator wheel, wherein the at least one generator generates electrical power and produces zero carbon emissions while the generator wheel rotates on the rail.

The generator holder may include at least one of a shock adsorber and a spring configured to be coupled to the train vehicle chassis.

The at least one generator may include a first generator and a second generator. The generator axle may pass through the generator wheel to couple the first generator and the second generator to the first generator wheel.

The at least one generator may include a rectifier, an AC/DC converter, and an automatic voltage regulator configured to deliver a voltage in a range of 800 to 900 volts from the at least one generator to a battery.

The at least one generator may include one or more graphene winded wires, carbon nanotube (CNT) wires, copper wires, and composite wires, which include one or more of carbon nanotube, graphene, carbon, and copper.

The at least one generator may include a revolutions per minute switch to adjust a revolutions per minute of the at least one generator.

The at least one generator may include an AC motor including a rotor and at least six magnets on the rotor.

The at least one generator may generate power in the range of 10 to 100 kilowatt hours.

The generator wheel may be one of a magnetic wheel, a plastic wheel, a steel wheel, a rubber wheel, and a phenolic wheel.

The generator wheel may have a holding force of about 2000 pounds to hold the generator wheel to the rail.

The generator holder, which may hold the at least one generator, may be installable on a wheel mounting bracket, which is coupled to the train vehicle chassis.

The generator holder, which holds at least one generator, may be installable on a train vehicle bogie, which is coupled to the train vehicle chassis.

The train vehicle may be one of a locomotive, a caboose, a coal car; a passenger car; a box car; a refrigerated box car; a centerbeam car; a covered hopper car; an oil car; a flat car; a gondola car; an intermodal equipment car; an open-top hopper car; a tank car; a subway car; a well car; a train trailer, and an electrical train vehicle.

As an embodiment of the present invention, a train vehicle power generating system for generating electrical power for a train vehicle is proposed. The train vehicle power generating system may include: a plurality of generators to generate electrical power; a plurality of generator holders installable on a train vehicle chassis, wherein each generator holder is configured to hold one or more of the plurality of generators; a plurality of generator wheels configured to touch a first rail and capable of rotating in any direction along the first rail or configured to touch a second rail and capable of rotating in any direction along the second rail; a plurality of generator axles configured to couple one or more generators to generator holders, wherein the plurality of generators generates electrical power and produces zero carbon emissions while the plurality of generator wheels rotate on the first rail or the second rail.

As an embodiment of the present invention, a train vehicle power generating system for generating electrical power for a train vehicle is proposed. The train vehicle power generating system may include: at least one generator to generate electrical power, the at least one generator including a first generator and a second generator; a first generator wheel configured to touch a first rail and capable of rotating in any direction along the first rail; a second generator wheel configured to touch a second rail and capable of rotating in any direction along the second rail; and a generator axle configured to couple the first generator wheel to the second generator wheel, configured to couple the first generator wheel and the second generator wheel to a train vehicle chassis, and configured to couple a first generator to the first generator wheel and the second generator to the second generator wheel, wherein the first generator and the second generator generate electrical power and produce zero carbon emissions while the first generator wheel rotates on the first rail and the second generator wheel rotates on the second rail.

The at least one generator may further include: a third generator and a fourth generator; and the generator axle couples the third generator to the first generator wheel and couples the fourth generator to the second generator wheel.

The generator axle may be installable on a wheel mounting bracket, which is coupled to the train vehicle chassis.

The generator axle may be installable on a train vehicle bogie, which is coupled to the train vehicle chassis.

The first generator wheel may be one of a magnetic wheel, a plastic wheel, a steel wheel, a rubber wheel, and a phenolic wheel; and the second generator wheel is one of a magnetic wheel, a plastic wheel, a steel wheel, a rubber wheel, and a phenolic wheel.

The train vehicle may be one of a locomotive, a caboose, a coal car; a passenger car; a box car; a refrigerated box car; a centerbeam car; a covered hopper car; an oil car; a flat car; a gondola car; an intermodal equipment car; an open-top hopper car; a tank car; a subway car; a well car; a train trailer, and an electrical train vehicle.

As an embodiment of the present invention, a renewable power generating system for generating electrical power for a vehicle is proposed. The renewable power generating system may include at least one generator to generate electrical power; a generator holder to hold the at least one generator and installable on a vehicle chassis; a generator wheel configured to touch a surface and capable of rotating in any direction along the surface, wherein the surface includes one of a rail and a road; and a generator axle to couple the at least one generator to the generator wheel, wherein the at least one generator generates electrical power and produces zero carbon emissions while the generator wheel rotates along the surface.

The vehicle may be a train vehicle. The train vehicle may be one of a locomotive, a caboose, a coal car; a passenger car; a box car; a refrigerated box car; a centerbeam car; a covered hopper car; an oil car; a flat car; a gondola car; an intermodal equipment car; an open-top hopper car; a tank car; a subway car; a well car; a train trailer, and an electrical train vehicle.

The vehicle may be an electric vehicle and the generator wheel may be a tire.

The generator holder may include at least one of a shock adsorber and a spring configured to be coupled to the vehicle chassis.

The vehicle may be a train vehicle chassis. The generator holder, which may hold at least one generator, may be installable on a train vehicle bogie, which may be coupled to the train vehicle chassis.

The vehicle may be a train vehicle chassis. The generator holder, which holds the at least one generator, may be installable on a wheel mounting bracket, which may be coupled to the vehicle chassis.

The at least one generator may include a first generator and a second generator. The generator axle may pass through the generator wheel to couple the first generator and the second generator to the generator wheel.

The at least one generator may include a rectifier, an AC/DC converter, and an automatic voltage regulator configured to deliver a voltage to a battery.

The renewable power generating system may include one or more wind turbines including a first wind turbine, wherein the generator axle has a first end, and the first wind turbine is installable at the first end of the generator axle.

The one or more wind turbines may include a second wind turbine. The generator axle may have a second end, and the second wind turbine may be installable at the second end of the generator axle.

The renewable power generating system may include a wind turbine cover to cover a portion of the first wind turbine to reduce wind resistance; and a wind turbine cover holder installable on the vehicle chassis to hold the wind turbine cover over the portion of the wind turbine.

The at least one generator may generate electrical power and produce zero carbon emissions while the one or more wind turbines, the generator axle, and the generator wheel rotate.

As an embodiment of the present invention, a renewable power generating system for generating electrical power for a vehicle is proposed. The renewable power generating system may include a plurality of generators to generate electrical power; a plurality of generator holders installable on a vehicle chassis, wherein each generator holder is configured to hold one or more of the plurality of generators; a plurality of generator wheels configured to touch a first surface and capable of rotating in any direction along the first surface or configured to touch a second surface and capable of rotating in any direction along the second surface; and a plurality of generator axles configured to couple one or more generators to generator holders, wherein the plurality of generators generates electrical power and produces zero carbon emissions while the plurality of generator wheels rotate on the first surface or the second surface.

The vehicle may be a train vehicle. The first surface may be a first rail and the second surface may be a second rail. The train vehicle may be one of a locomotive, a caboose, a coal car; a passenger car; a box car; a refrigerated box car; a centerbeam car; a covered hopper car; an oil car; a flat car; a gondola car; an intermodal equipment car; an open-top hopper car; a tank car; a subway car; a well car; a train trailer, and an electrical train vehicle.

The vehicle may be an electric vehicle. The first surface and the second surface may be the same. The plurality of generator wheels may be tires.

The renewable power generating system may further include one or more wind turbines. Each of the plurality of generator axles may have a first end and a second end. One or more wind turbines may be installable on one or more first ends and second ends of the plurality of generator axles.

The plurality of generators may generate electrical power and produce zero carbon emissions while the one or more wind turbines, the plurality of generator axles, and the plurality of generator wheels rotate.

As an embodiment of the present invention, a renewable power generating system for generating electrical power for a vehicle is proposed. The train renewable power generating system may include at least one generator to generate electrical power, the at least one generator including a first generator and a second generator; a first generator wheel configured to touch a first surface and capable of rotating in any direction along the first surface; a second generator wheel configured to touch a second surface and capable of rotating in any direction along the second surface; a generator axle configured to couple the first generator wheel to the second generator wheel, configured to couple the first generator wheel and the second generator wheel to a vehicle chassis, and configured to couple a first generator to the first generator wheel and the second generator to the second generator wheel, wherein the first generator and the second generator generate electrical power and produce zero carbon emissions while the first generator wheel rotates on the first surface and the second generator wheel rotates on the second surface, wherein the first surface and the second surface are the same surface or different surfaces.

The renewable power generating system may further include one or more wind turbines. The generator axle may have a first end and a second end. The one or more wind turbines may be installable on the first end, the second end, or both the first end and the second end of the generator axle. The generator generates electrical power and produce zero carbon emissions while the one or more wind turbines, the generator axle, the first generator wheel, and the second generator wheel are rotating.

The vehicle may be a train vehicle. The first surface is a first rail and the second surface is a second rail. The train vehicle may be one of a locomotive, a caboose, a coal car; a passenger car; a box car; a refrigerated box car; a center-beam car; a covered hopper car; an oil car; a flat car; a gondola car; an intermodal equipment car; an open-top hopper car; a tank car; a subway car; a well car; a train trailer, and an electrical train vehicle.

Additional aspects will be set forth in part in the description which follows and, in part will be apparent from the description, or may be learned by practice of the presented embodiments.

BRIEF DESCRIPTION OF THE DRAWINGS

These and other aspects will become apparent and more readily appreciated from the following description of the embodiments, taken in conjunction with the accompanying drawings of which.

The features and advantages of the present invention will become more apparent from the detailed description set forth below when taken in conjunction with the drawings in which like reference numerals indicate identical or functionally similar elements.

DETAILED DESCRIPTION

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below by referring to the figures, to explain aspects of the present description. Terms used herein are for descriptive purposes only and are intended to limit the scope of the invention. The terms "comprises" and/or "comprising" are used to specify the presence of stated elements, steps, operations, and/or components, but do not preclude the presence or addition of one or more elements, steps, operations, and/or components. The terms "first," "second," and the like may be used to describe various elements, but do not limit the elements. Such terms are used only to classify one element from another.

It is noted that wherever practicable, similar or like reference numbers may be used in the drawings and may indicate similar or like elements.

Figure 1:
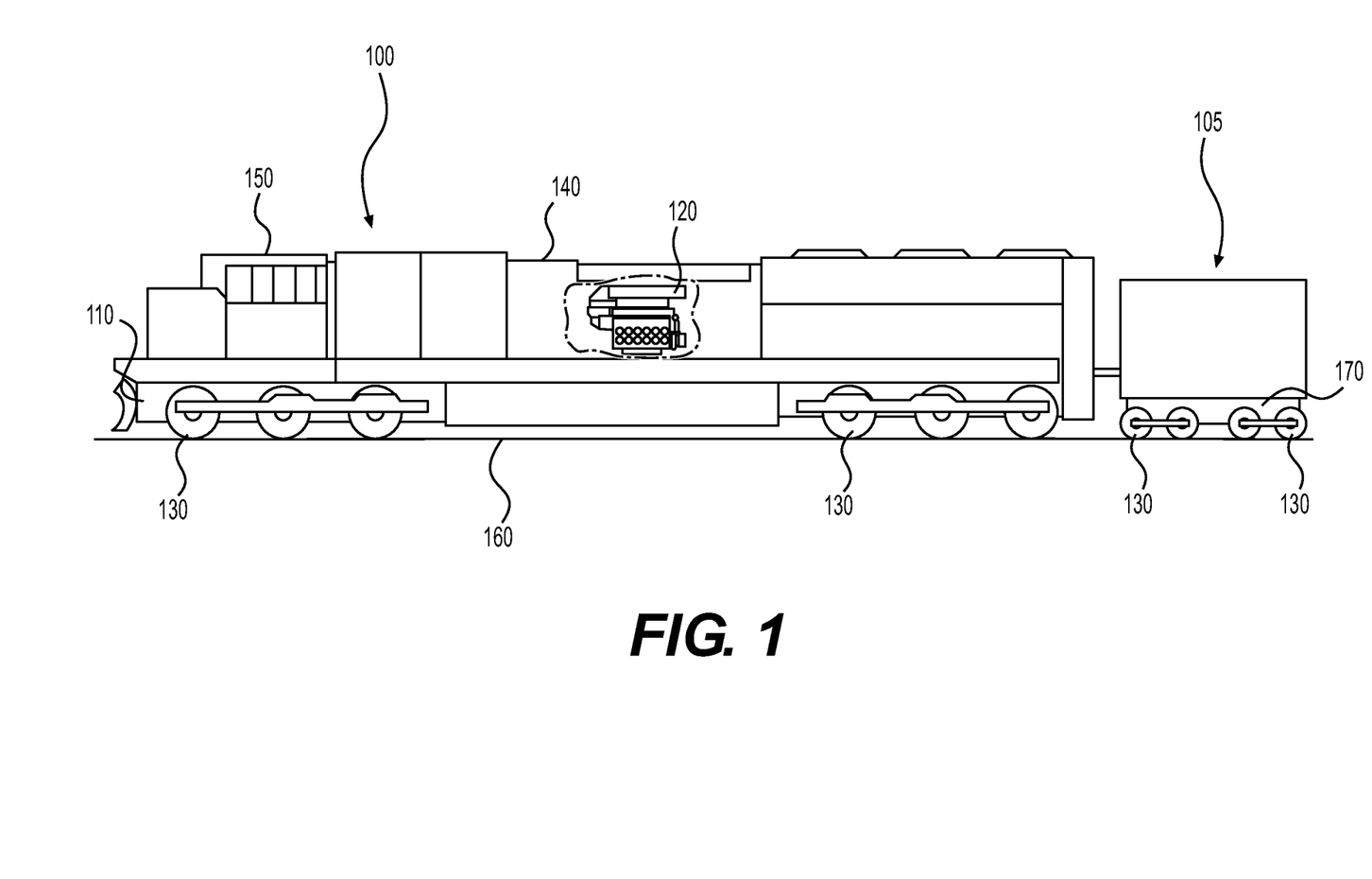
FIG. 1 illustrates a side view of a locomotive and train car, which are examples of train vehicles forming a train.

Referring to FIG. 1, FIG. 1 illustrates examples of train vehicles. Although the drawings including FIG. 1 refer to train vehicles as an example, it is understood that renewable power generating systems are applicable to different types of vehicles including electrical vehicles such as cars, buses, trucks, trailers, and the like, which move along a surface such as a road instead of rails used by train vehicles.

Referring to FIG. 1, a train vehicle may be a locomotive 100 or a train car 105. FIG. 1 illustrates a side view of a locomotive 100 and train car 105 forming an example of a train to which embodiments of the present invention may be applied, so that people and freight are transported by trains in a manner that is friendly to the environment. A locomotive 100 is an engine car which provides motive power for one or more train cars 105 which are collectively referred to as a train. The locomotive 100 may be any type of car providing motive power to move the train. For example, the locomotive 100 may be powered by electrical power, steam, and fossil fuels such as diesel. Electrical power may be supplied by batteries and/or power lines for example. However, all motive power is contemplated. The locomotive 100 may be operated by train operators for operating or monitoring the train or the locomotive 100 may be operated autonomously.

In the example in FIG. 1, a locomotive 100 may include a chassis (body) 110, an engine 120 supported by the chassis 110, wheels 130 supporting the chassis 110 and driven by the engine 120, and an envelope 140 covering at least the chassis 110 and the engine 120. Wheels 130 may be made of different materials including steel and may be coupled to a wheel shaft, which is coupled to a chassis 110. An envelope 140 of the locomotive 100 is an outline of the space occupied by the locomotive 100 when in motion, including the effects of tilt, sway, track cant, etc. The locomotive 100 also includes a cab 150 which is a control center for the train. The cab 150 may be accessible to train operators for operating the train or monitoring the train. The cab 150 may also be the control center for an autonomous operation of the train. In addition to wheels 130 supporting chassis 110, wheels 130 may rest or rotate on rails 160.

In the example in FIG. 1, a train car 105 includes a train car chassis (train car body) 170 and wheels 130 supporting the train car chassis (train car body) 170 as well as resting or rotating on rails 160. A train car 105 may be forty to fifth feet in length. Wheels 130 may be made of different materials including steel and may be coupled to a wheel shaft, which is coupled to a train car chassis (train car body) 170. All train vehicles including train cars 105 also have an envelope. A train car 105 may be one of a caboose, a coal car; a passenger car; a box car; a refrigerated box car; a centerbeam car; a covered hopper car; an oil car; a flat car; a gondola car; an intermodal equipment car; an open-top hopper car; a tank car; a subway car; a well car; a train trailer, and an electrical train vehicle.

One or more wheels 130 may be part of an assembly such as a bogie, which is coupled to a chassis (body) of a train vehicle. Examples of a train vehicle chassis include locomotive chassis 110 and train car chassis 170. A bogie is a framework that may carry a wheelset (group of wheels 130) which is part of a train vehicle (i.e., a modular subassembly of wheels and axles which are part of a train vehicle). The bogie may include a suspension or may be solid and in turn be suspended. The bogie may be mounted on a swivel, as traditionally on a train vehicle. One or more wheels 130 may be coupled to a chassis of a train vehicle through a wheel shaft. A bogie is an example of an assembly which may couple one or more wheels 130 to a train vehicle chassis (train vehicle body) so that the train vehicle chassis (train vehicle body) is supported by the wheels 130. The wheel 130 and the wheel shaft may both be part of a bogie, which may be coupled to the train vehicle chassis.

Referring to FIGS. 2-5, the power generating systems shown in these exemplary embodiments are installable on any train vehicle without generating any carbon emissions. All power generating systems may supply power directly to train vehicle components such as brakes, running lights, sensors to sense conditions on the train vehicle including temperature sensors, and transmission systems for transmitted the sensed information. All power generating systems may supply power to one or more batteries, which may also supply power to one or more train vehicle components. The one or more batteries may also be a train vehicle component.

Referring to FIGS. 2-5, all train vehicles have a train vehicle chassis. All power generating systems may be installed on a train vehicle chassis. All power generating systems may be installable on one or more wheel mounting brackets which may be coupled to a train vehicle chassis. All power generating systems may be installed on a train vehicle bogie, which is coupled to the train vehicle chassis. All power generating systems may be installed at any location including a factory, a trainyard, etc. All power generating systems may be installed on a first side of the train so that the power generating system touches a first rail and may be installed on a second side of the train so that the power generating system touches a second rail. Examples of a train vehicle to which power generating systems of FIGS. 2-5 may be installed include a locomotive, a caboose, a coal car; a passenger car; a box car; a refrigerated box car; a centerbeam car; a covered hopper car; an oil car; a flat car; a gondola car; an intermodal equipment car; an open-top hopper car; a tank car; a subway car; a well car; a train trailer, and an electrical train vehicle.

Referring to FIGS. 2-5 and 8, one or more generators are denoted by reference numeral 200 and may include components such as a rectifier 800, AC/DC converter 810, and automatic voltage regulator 820, which may be configured to deliver a voltage in the range of 800 to 900 volts. One or more generators 200 may include one or more graphene winded wires, carbon nanotube (CNT) wires, copper wires, and composite wires, which include one or more of carbon nanotube, graphene, carbon, and copper. One or more generators 200 may include a revolutions per minute switch to adjust a revolutions per minute of the one or more generators 200. One or more generators may include an AC motor including a rotor and at least six magnets on the rotor. One or more generators 200 may generate power in a range of 10 to 100 kilowatt hours.

Referring to FIGS. 2-5, one or more generator wheels may be denoted by reference numeral 230. One or more generator wheels may have a holding force of about 2000 pounds to hold the generator wheel 230 to a rail. The one or more generator wheels 230 may be one of a magnetic wheel, a plastic wheel, a steel wheel, a rubber wheel, and a phenolic wheel.

Figure 2:
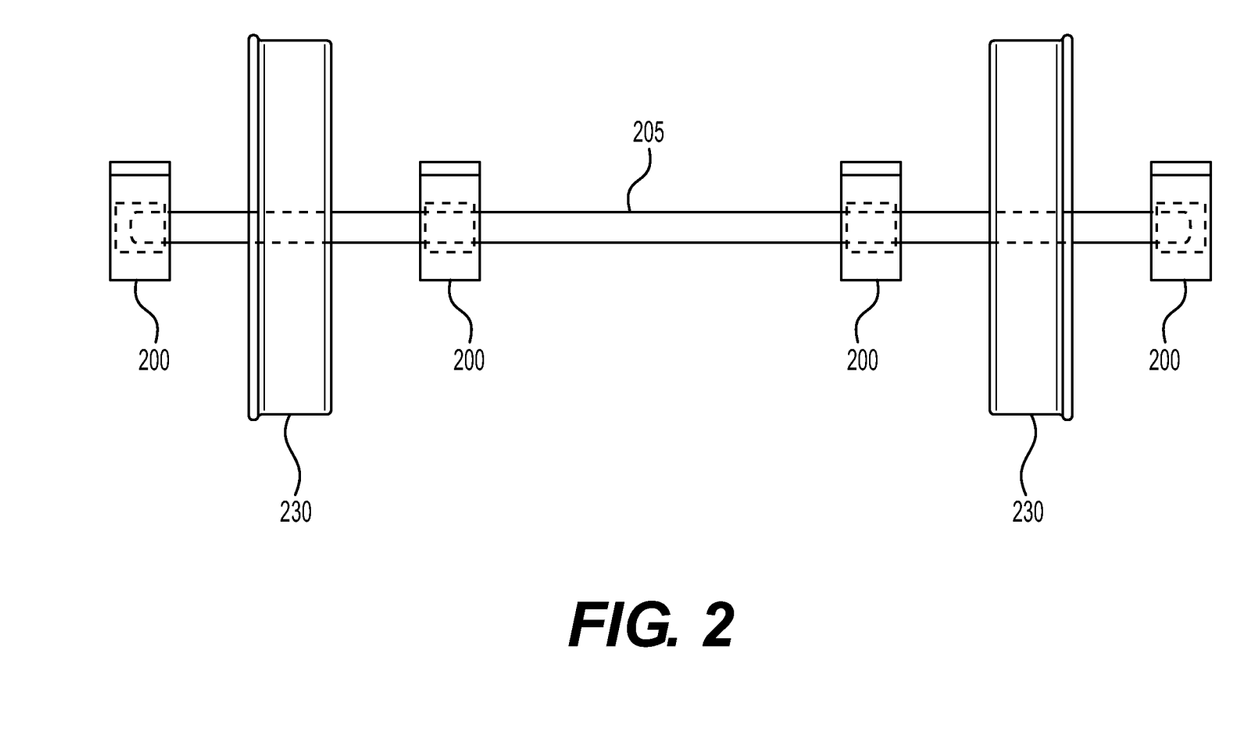
FIG. 2 illustrates a top view of an embodiment of a train vehicle power generating system installable on a train vehicle.

Referring to FIG. 2, FIG. 2 illustrates a top view of an embodiment of a train vehicle power generation system installable on any train vehicle to supply electrical power to the train vehicle without generating any carbon emissions. In the example in FIG. 2, a plurality of generators 200 are coupled to a generator axle 205 and are coupled to generator wheels 230. The generator axle 205 may couple the generator wheels 230 and may also couple the generator wheels 230 to one or more generators 200. In the example of FIG. 2, generator wheels 230 are configured to touch and rotate along a rail (not shown). One of the generator wheels 230 is configured to touch and rotate along one rail (a first rail) and the other generator wheel 230 is configured to touch and rotate along another rail (a second rail). Both generator wheels 230 may have the same construction. In an embodiment, the generator axle 205 is installable on a train vehicle chassis. In an embodiment, the generator axle 205 is installable on a wheel mounting bracket which is coupled to any train vehicle chassis. In another embodiment, the generator axle 205 is installable on any train vehicle bogie, which is coupled to any train vehicle chassis. More than one of a power generation system shown in FIG. 2 may be applied to any train vehicle chassis.

Figure 3:
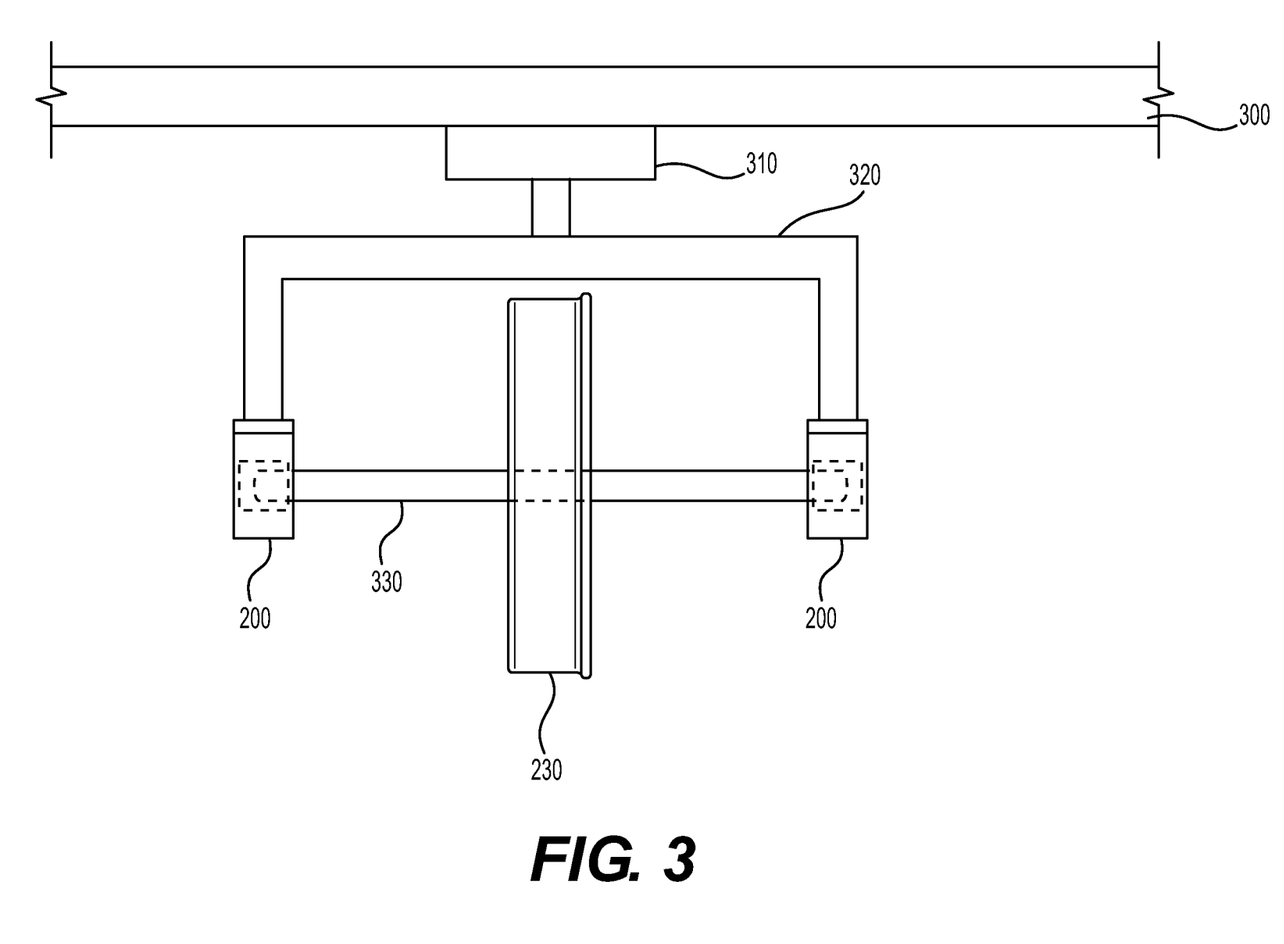
FIG. 3 illustrates a front view of an embodiment of a train vehicle power generating system installable on a train vehicle.

Referring to FIG. 3, FIG. 3 illustrates a front view of an embodiment of a train vehicle power generation system installable on any train vehicle to supply electrical power to the train vehicle without generating any carbon emissions. In FIG. 3, a chassis 300 is coupled to a shock adsorber 310 of a generator holder 320. A generator holder 320 may include at least one of a shock adsorber 310 and a spring configured to be coupled to the train vehicle chassis 300. The train vehicle chassis 300 may the chassis of any train vehicle including a locomotive, a caboose, a coal car; a passenger car; a box car; a refrigerated box car; a centerbeam car; a covered hopper car; an oil car; a flat car; a gondola car; an intermodal equipment car; an open-top hopper car; a tank car; a subway car; a well car; a train trailer, and an electrical train vehicle. In the example in FIG. 3, a train vehicle holder 320 is configured to hold two generators, and a generator axle 330 couples the two generators 200 to the generator wheel 230. The generator axle 330 may pass through the generator wheel 230 to couple the two generators 230. In another embodiment, the generator holder 320 is installable on a wheel mounting bracket which may be coupled to a train vehicle chassis 300. In another embodiment, the generator holder 320 is installable on a train vehicle bogie, which may be coupled to the train vehicle chassis 300. In embodiments, the generator holder 320 is installable on both sides of a train vehicle. In addition, more than one generator holder 320 is installable on the same side a train vehicle.

Figure 4:
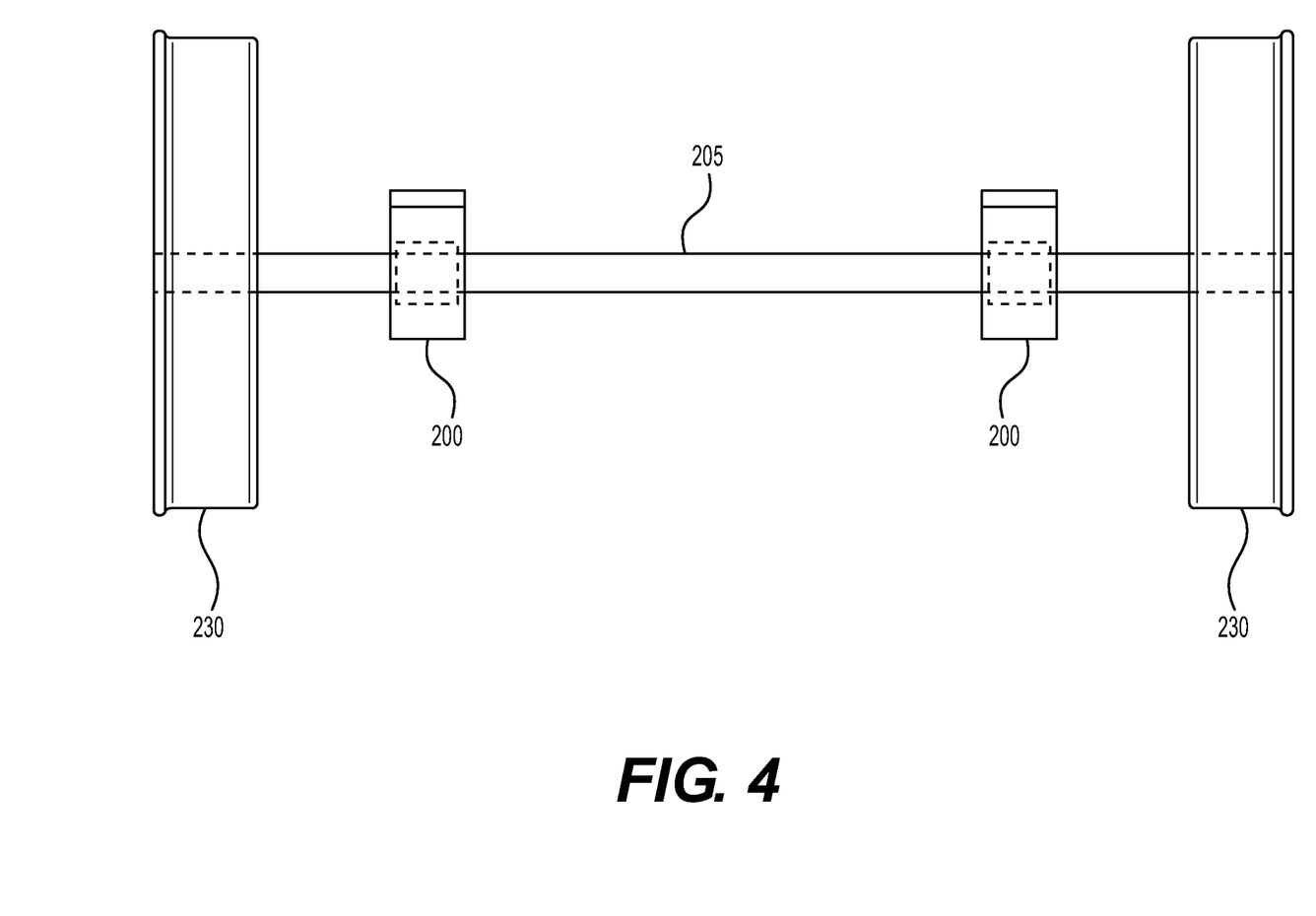
FIG. 4 illustrates a top view of an embodiment of a train vehicle power generating system installable on a train vehicle.

Referring to FIG. 4, FIG. 4 illustrates a top view of an embodiment of a train vehicle power generation system installable on any train vehicle to supply electrical power to the train vehicle without generating any carbon emissions. In the example in FIG. 4, a plurality of generators 200 are coupled to a generator axle 205 and each generator 200 is coupled to a generator wheel 230. The generator axle 205 may couple the generator wheels 230 and may also couple each generator wheel 230 to one of the generators 200. In the example of FIG. 4, generator wheels 230 are configured to touch and rotate along a rail (not shown). One of the generator wheels 230 is configured to touch and rotate along one rail (a first rail) and the other generator wheel 230 is configured to touch and rotate along another rail (a second rail). Both generator wheels 230 may have the same construction. In an embodiment, the generator axle 205 is installable on a train vehicle chassis. In an embodiment, the generator axle 205 is installable on a wheel mounting bracket which is coupled to a train vehicle chassis. In another embodiment, the generator axle 205 is installable on any train vehicle bogie, which is coupled to any train vehicle chassis. More than one of a power generation system shown in FIG. 4 may be applied to any train vehicle chassis.

Figure 5:
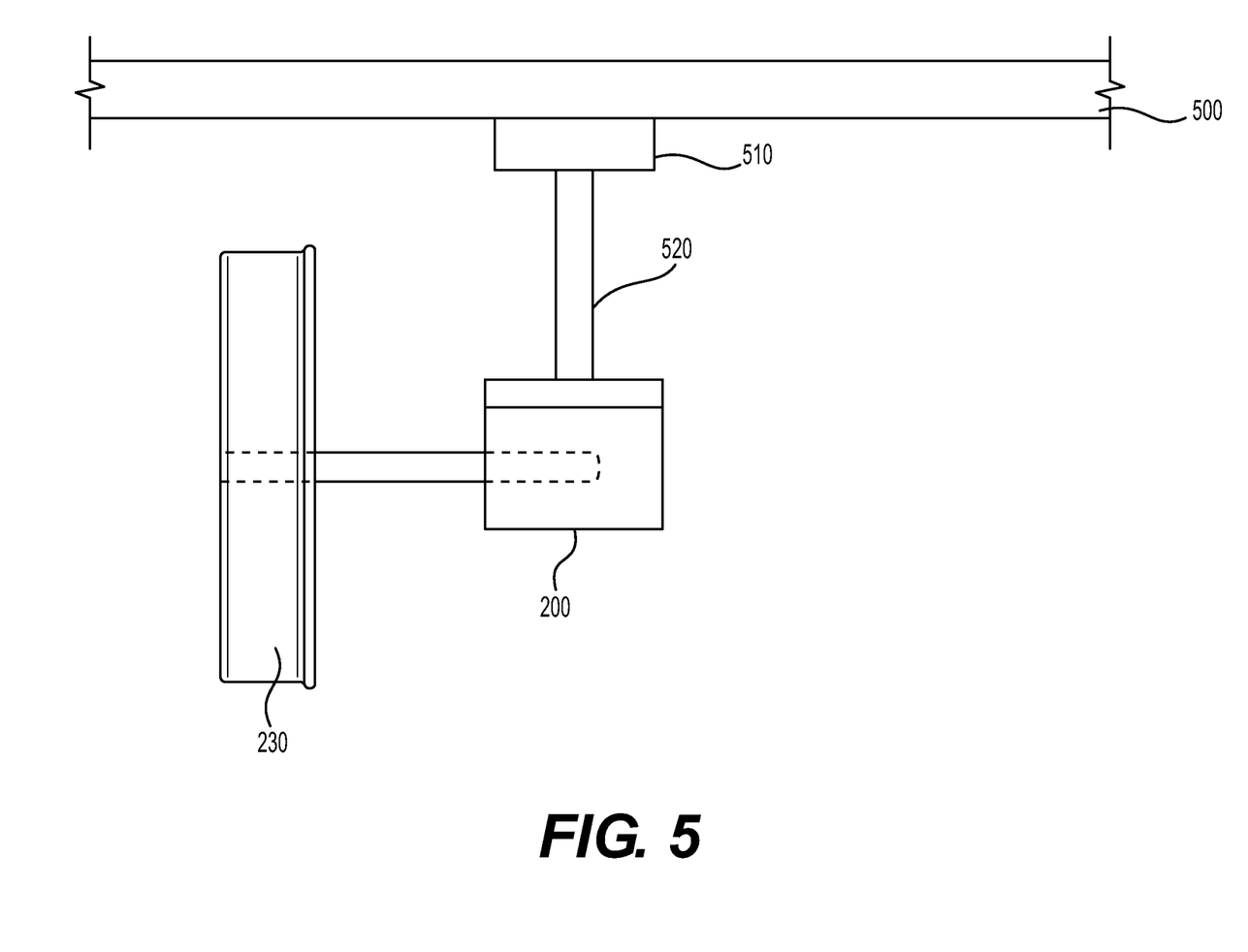
FIG. 5 illustrates a front view of an embodiment of a train vehicle power generating system installable on a train vehicle.

Referring to FIG. 5, FIG. 5 illustrates a top view of an embodiment of a train vehicle power generation system installable on any train vehicle to supply electrical power to the train vehicle without generating any carbon emissions. In FIG. 5, a chassis 500 is coupled to a shock adsorber 510 of a generator holder 520. A generator holder 520 may include at least one of a shock adsorber 510 and a spring configured to be coupled to the train vehicle chassis 500. The train vehicle chassis 500 may the chassis of any train vehicle including a locomotive, a caboose, a coal car; a passenger car; a box car; a refrigerated box car; a centerbeam car; a covered hopper car; an oil car; a flat car; a gondola car; an intermodal equipment car; an open-top hopper car; a tank car; a subway car; a well car; a train trailer, and an electrical train vehicle. In the example in FIG. 5, a train vehicle holder 520 is configured to hold a generator 200 and a generator wheel 230. The generator holder 520 may include an axle which couples a generator 200 to a generator wheel 230. In another embodiment, the generator holder 520 is installable on a wheel mounting bracket which may be coupled to a train vehicle chassis 500. In another embodiment, the generator holder 520 is installable on a train vehicle bogie, which may be coupled to the train vehicle chassis 500. In embodiments, the generator holder 520 is installable on both sides of a train vehicle. In addition, more than one holder 520 is installable on the same side of a train vehicle.

Figure 6:
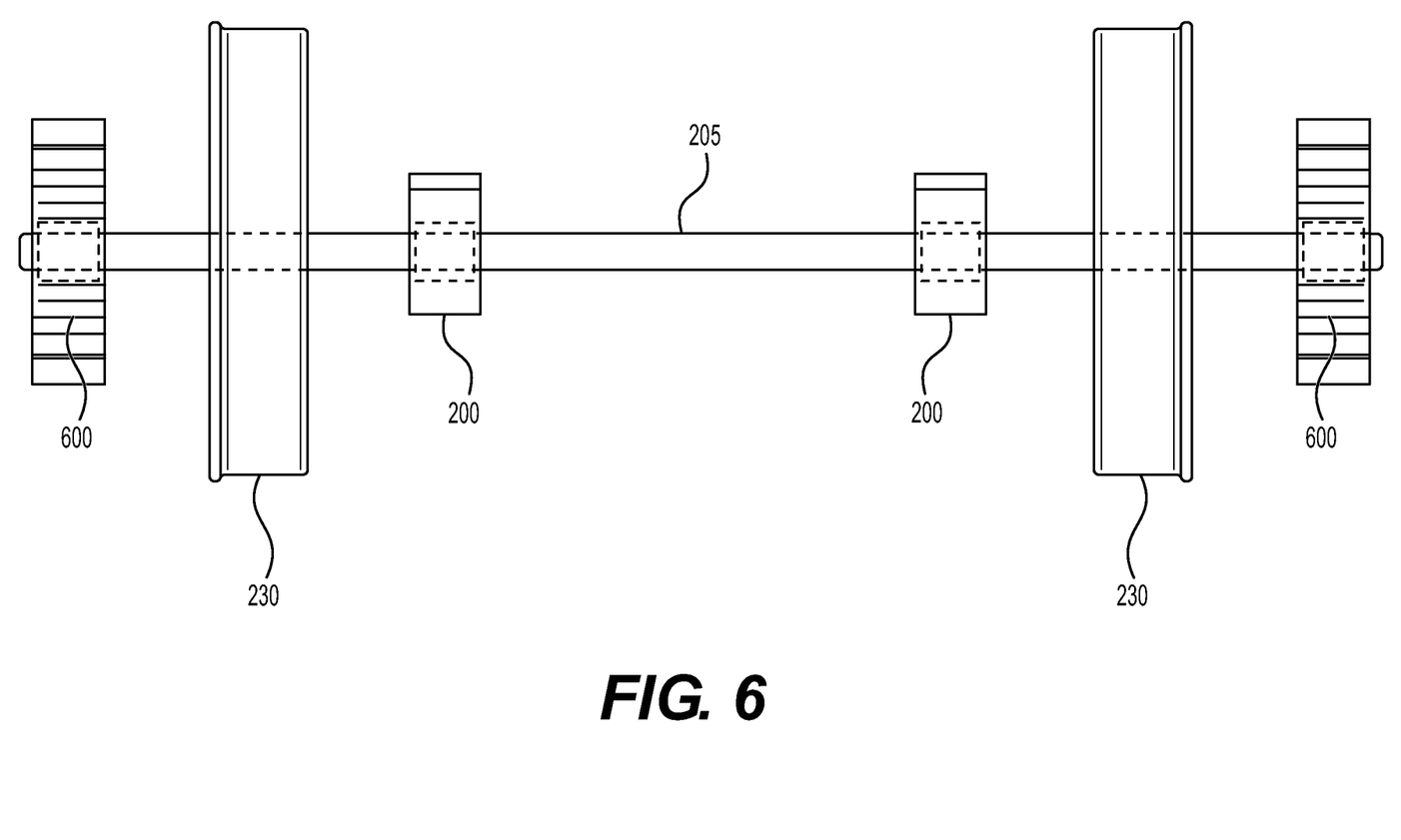
FIG. 6 illustrates a top view of an embodiment of a train vehicle power generating system installable on a train vehicle.
Figure 7:
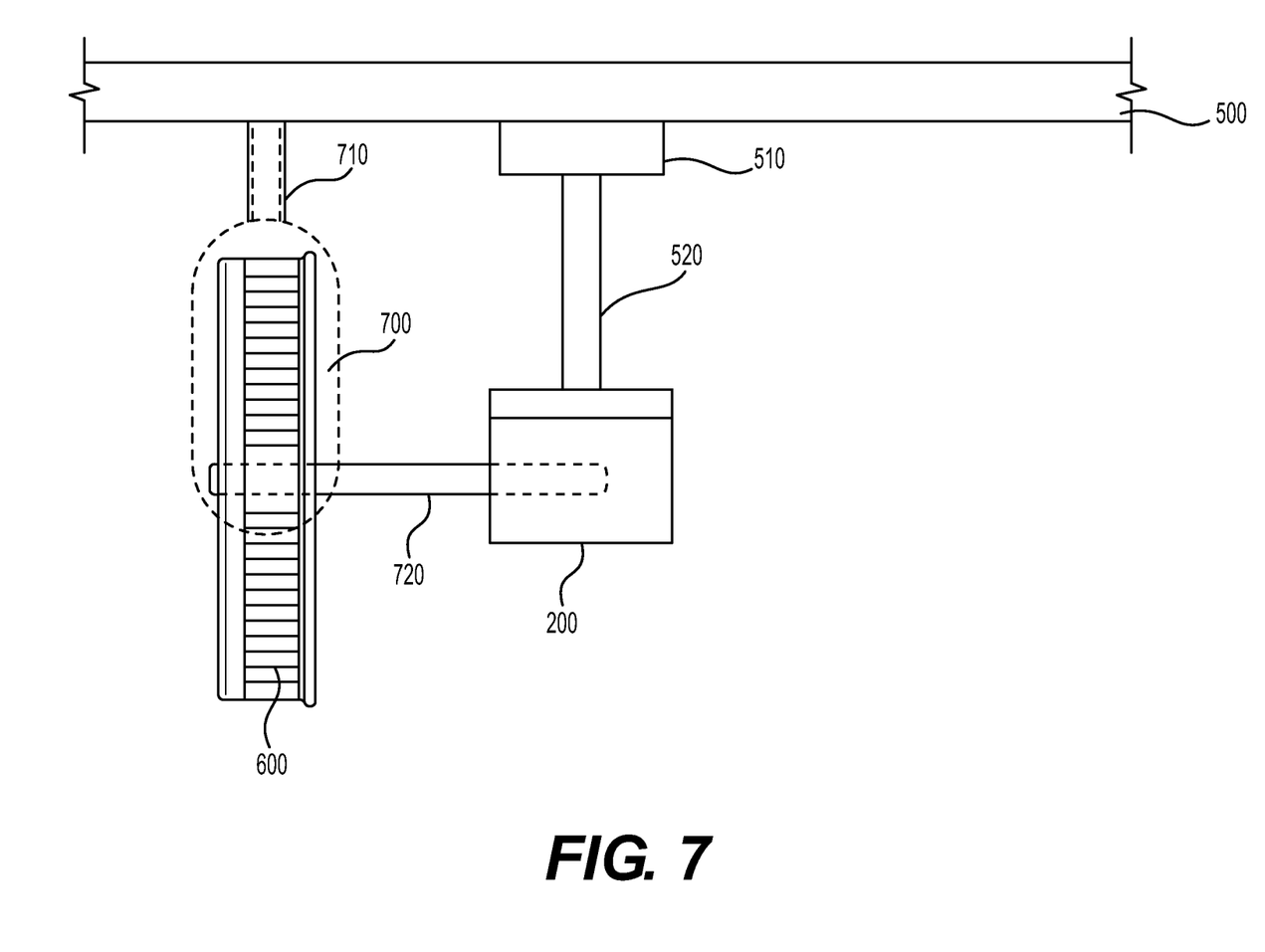
FIG. 7 illustrates a front view of an embodiment of a train vehicle power generating system installable on a train vehicle.

Referring to FIGS. 6-7, the power generating systems shown in these exemplary embodiments are installable on any train vehicle without generating any carbon emissions. All power generating systems may supply power directly to train vehicle components such as brakes, running lights, sensors to sense conditions on the train vehicle including temperature sensors, and transmission systems for transmitted the sensed information. All power generating systems may supply power to one or more batteries, which may also supply power to one or more train vehicle components. The one or more batteries may also be a train vehicle component.

Referring to FIGS. 6-7, all train vehicles have a train vehicle chassis. All power generating systems may be installed on a train vehicle chassis. All power generating systems may be installable on one or more wheel mounting brackets which may be coupled to a train vehicle chassis. All power generating systems may be installed on a train vehicle bogie, which is coupled to the train vehicle chassis. All power generating systems may be installed at any location including a factory, a trainyard, etc. All power generating systems may be installed on a first side of the train so that the power generating system touches a first rail and may be installed on a second side of the train so that the power generating system touches a second rail. Examples of a train vehicle to which power generating systems of FIGS. 6-7 may be installed include a locomotive, a caboose, a coal car; a passenger car; a box car; a refrigerated box car; a centerbeam car; a covered hopper car; an oil car; a flat car; a gondola car; an intermodal equipment car; an open-top hopper car; a tank car; a subway car; a well car; a train trailer, and an electrical train vehicle.

Figure 8:
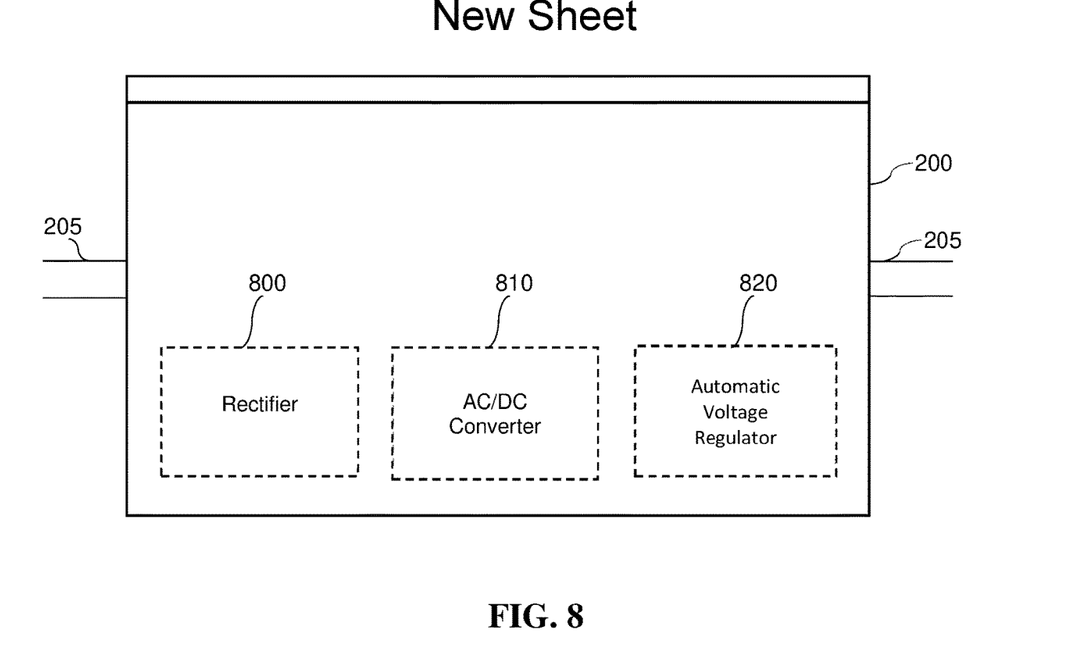
FIG. 8 illustrates a generator according to an embodiment.

Referring to FIGS. 6-8, one or more generators are denoted by reference numeral 200 and may include components such as a rectifier 800, AC/DC converter 810, and automatic voltage regulator 820, which may be configured to deliver a voltage to a battery for example. One or more generators 200 may include one or more graphene winded wires, carbon nanotube (CNT) wires, copper wires, and composite wires, which include one or more of carbon nanotube, graphene, carbon, and copper. One or more generators 200 may include a revolutions per minute switch to adjust a revolutions per minute of the one or more generators 200. One or more generators may include an AC motor including a rotor and at least six magnets on the rotor.

Referring to FIGS. 6-7, one or more generator wheels may be denoted by reference numeral 230. One or more generator wheels may have a holding force of about 2000 pounds to hold the generator wheel 230 to a rail. The one or more generator wheels 230 may be one of a magnetic wheel, a plastic wheel, a steel wheel, a rubber wheel, and a phenolic wheel.

FIG. 6 illustrates a top view of an embodiment of a train vehicle power generation system installable on any train vehicle to supply electrical power to the train vehicle without generating any carbon emissions. In the example in FIG. 6, a plurality of generators 200 are coupled to a generator axle 205 and a plurality of wind turbines 600 are coupled to a generator axle 205. The generator axle 205 may couple the generator wheels 230. The generator axle 205 may couple the wind turbines 600 to one or more generators 200 and may also couple the generator wheels 230 to one or more generators 200. For example, a wind turbine 600 may be installed at one end of the generator axle 205 or at both ends of the generator axle 205. Each wind turbine power force may be about 250 pounds per square meter when train vehicle is moving at about 70 miles per hour with zero carbon emissions. Because more power is being generated by one or more wind turbines 600, the size of generators 200 and generator components may increase to take advantage of the increased power. Although FIG. 6 shows additional components which may increase the weight of the train vehicle power system, this weight is loaded onto the wheels 230. Accordingly, this weight is a towing load and uses a minimal energy from the train vehicle.

In the example of FIG. 6, generator wheels 230 are configured to touch and rotate along a rail (not shown). One of the generator wheels 230 is configured to touch and rotate along one rail (a first rail) and the other generator wheel 230 is configured to touch and rotate along another rail (a second rail). Both generator wheels 230 may have the same construction. In an embodiment, the generator axle 205 is installable on a train vehicle chassis. In an embodiment, the generator axle 205 is installable on a wheel mounting bracket which is coupled to any train vehicle chassis. In another embodiment, the generator axle 205 is installable on any train vehicle bogie, which is coupled to any train vehicle chassis. More than one of a power generation system shown in FIG. 6 may be applied to any train vehicle chassis.

Referring to FIG. 7, FIG. 7 illustrates a front view of an embodiment of a train vehicle power generation system installable on any train vehicle to supply electrical power to the train vehicle without generating any carbon emissions.

In FIG. 7, a chassis 500 is coupled to a shock adsorber 510 of a generator holder 520. A generator holder 520 may include at least one of a shock adsorber 510 and a spring configured to be coupled to the train vehicle chassis 500. The train vehicle chassis 500 may the chassis of any train vehicle including a locomotive, a caboose, a coal car; a passenger car; a box car; a refrigerated box car; a centerbeam car; a covered hopper car; an oil car; a flat car; a gondola car; an intermodal equipment car; an open-top hopper car; a tank car; a subway car; a well car; a train trailer, and an electrical train vehicle. In the example in FIG. 7, a wind turbine cover 700 partially covers a wind turbine 600, and the wind turbine cover 700 is held by a wind turbine cover holder 720, which may be mounted to train vehicle chassis 500.

As illustrated in FIG. 7, a train vehicle holder 520 is configured to hold a generator 200 and the wind turbine 600. The generator holder 520 may include an axle 720 which couples a generator 200 to the wind turbine 600. Axle 720 may be referred to as a generator axle. In one or more embodiments, the wind turbine cover 700 may cover up to 90 degrees below the axle 720 for reducing wind power resistance. The wind touches below axle 720 in a range of 90 degrees to 180 degrees below the axle. When the wind turbine 600 rotates by wind power, the axle 720 and the generator 200 rotate together to produce electric power. Alternatively, if the train vehicle requires more power to be generated, a generator wheel 230 may be coupled to axle 720 to touch and rotate on a rail to generate more electric power. The generator wheel 230 may be located in between the generator 200 and the wind turbine 600 in FIG. 7.

In another embodiment, the generator holder 520 is installable on a wheel mounting bracket which may be coupled to a train vehicle chassis 500. In another embodiment, the generator holder 520 is installable on a train vehicle bogie, which may be coupled to the train vehicle chassis 500. In embodiments, the generator holder 520 is installable on both sides of a train vehicle. In addition, more than one holder 520 is installable on the same side of a train vehicle.

In the exemplary embodiments shown in FIGS. 6 and 7, the power generation systems are installable upon train vehicles. In addition, these power generation systems including generators 200 and wind turbines 600 may be applied to any axle of any type of electric vehicle.

It should be understood that the exemplary embodiments described herein should considered in a description sense only and not for purposes of limitation. Descriptions of features or aspects within each embodiment should typically be considered as available for other similar features or aspects in other embodiments.

What is claimed is:

1. A renewable power generating system for generating electrical power for a vehicle, the renewable power generating system comprising:
   at least one generator to generate electrical power;
   a generator holder to hold the at least one generator and installable on a vehicle chassis;
   a generator wheel configured to touch a surface and capable of rotating in any direction along the surface, wherein the surface includes one of a rail and a road; and
   a generator axle to couple the at least one generator to the generator wheel, wherein the at least one generator generates electrical power and produces zero carbon emissions while the generator wheel rotates along the surface.

2. The renewable power generating system of claim 1, wherein:
   the vehicle is a train vehicle; and
   the train vehicle is one of a locomotive, a caboose, a coal car; a passenger car; a box car; a refrigerated box car; a centerbeam car; a covered hopper car; an oil car; a flat car; a gondola car; an intermodal equipment car; an open-top hopper car; a tank car; a subway car; a well car; a train trailer, and an electrical train vehicle.

3. The renewable power generating system of claim 1, wherein:
   the vehicle is an electric vehicle; and
   the generator wheel is a tire.

4. The renewable power generating system of claim 1, wherein the generator holder includes at least one of a shock adsorber and a spring configured to be coupled to the vehicle chassis.

5. The renewable power generating system of claim 4, wherein:
   the vehicle chassis is a train vehicle chassis; and
   the generator holder, which holds at least one generator, is installable on a train vehicle bogie, which is coupled to the train vehicle chassis.

6. The renewable power generating system of claim 4, wherein:
   the vehicle chassis is a train vehicle chassis; and
   the generator holder, which holds the at least one generator, is installable on a wheel mounting bracket, which is coupled to the vehicle chassis.

7. The renewable power generating system of claim 1, wherein the at least one generator includes a first generator and a second generator, and wherein the generator axle passes through the generator wheel to couple the first generator and the second generator to the generator wheel.

8. The renewable power generating system of claim 1, wherein the at least one generator includes a rectifier, an AC/DC converter, and an automatic voltage regulator configured to deliver a voltage to a battery.

9. The renewable power generating system of claim 1, further comprising one or more wind turbines including a first wind turbine, wherein the generator axle has a first end, and the first wind turbine is installable at the first end of the generator axle.

10. The renewable power generating system of claim 9, wherein:
    the one or more wind turbines includes a second wind turbine;
    the generator axle has a second end; and
    the second wind turbine is installable at the second end of the generator axle.

11. The renewable power generating system of claim 9, further comprising:
    a wind turbine cover to cover a portion of the first wind turbine to reduce wind resistance; and
    a wind turbine cover holder installable on the vehicle chassis to hold the wind turbine cover over the portion of the wind turbine.

12. The renewable power generating system of claim 9, wherein the at least one generator generates electrical power and produces zero carbon emissions while the one or more wind turbines, the generator axle, and the generator wheel rotate.

13. A renewable power generating system for generating electrical power for a vehicle, the renewable power generating system comprising:
    a plurality of generators to generate electrical power;

a plurality of generator holders installable on a vehicle chassis, wherein each generator holder is configured to hold one or more of the plurality of generators;

a plurality of generator wheels configured to touch a first surface and capable of rotating in any direction along the first surface or configured to touch a second surface and capable of rotating in any direction along the second surface; and a plurality of generator axles configured to couple one or more generators to generator holders, wherein the plurality of generators generates electrical power and produces zero carbon emissions while the plurality of generator wheels rotate on the first surface or the second surface.

14. The renewable power generating system of claim 13, wherein:

the vehicle is a train vehicle;

the first surface is a first rail and the second surface is a second rail; and the train vehicle is one of a locomotive, a caboose, a coal car; a passenger car; a box car; a refrigerated box car; a centerbeam car; a covered hopper car; an oil car; a flat car; a gondola car; an intermodal equipment car; an open-top hopper car; a tank car; a subway car; a well car; a train trailer, and an electrical train vehicle.

15. The renewable power generating system of claim 13, wherein:

the vehicle is an electric vehicle;

the first surface and the second surface are the same; and the plurality of generator wheels are tires.

16. The renewable power generating system of claim 13, further comprising one or more wind turbines, wherein each of the plurality of generator axles has a first end and a second end, and wherein one or more wind turbines are installable on one or more first ends and second ends of the plurality of generator axles.

17. The renewable power generating system of claim 16, wherein the plurality of generators generate electrical power and produce zero carbon emissions while the one or more wind turbines, the plurality of generator axles, and the plurality of generator wheels rotate.

18. A renewable power generating system for generating electrical power for a vehicle, the renewable power generating system comprising:

at least one generator to generate electrical power, the at least one generator including a first generator and a second generator;

a first generator wheel configured to touch a first surface and capable of rotating in any direction along the first surface;

a second generator wheel configured to touch a second surface and capable of rotating in any direction along the second surface; and a generator axle configured to couple the first generator wheel to the second generator wheel, configured to couple the first generator wheel and the second generator wheel to a vehicle chassis, and configured to couple the first generator to the first generator wheel and the second generator to the second generator wheel, wherein the first generator and the second generator generate electrical power and produce zero carbon emissions while the first generator wheel rotates on the first surface and the second generator wheel rotates on the second surface, wherein the first surface and the second surface are the same surface or different surfaces.

19. The renewable power generating system of claim 18, wherein:

the vehicle is a train vehicle;

the first surface is a first rail and the second surface is a second rail; and the train vehicle is one of a locomotive, a caboose, a coal car; a passenger car; a box car; a refrigerated box car; a centerbeam car; a covered hopper car; an oil car; a flat car; a gondola car; an intermodal equipment car; an open-top hopper car; a tank car; a subway car; a well car; a train trailer, and an electrical train vehicle.

20. A renewable power generating system for generating electrical power for a vehicle, the renewable power generating system comprising:

one or more wind turbines;

at least one generator to generate electrical power, the at least one generator including a first generator and a second generator; and a generator axle configured to couple the first generator to the second generator, and configured to couple the first generator and the second generator to a vehicle chassis, wherein the generator axle has a first end and a second end;

wherein the one or more wind turbines are installable on the first end, the second end, or both the first end and the second end of the generator axle; and wherein the first generator and the second generator generate electrical power and produce zero carbon emissions while the one or more wind turbines are rotating.

* * * * *